Sept. 10, 1935.    J. A. McINTOSH    2,013,805

MECHANICAL FREE FLOATING BRAKE DRUM

Filed May 2, 1932

INVENTOR.
JAMES A. M<sup>c</sup> INTOSH
BY
John P. Tarbox
ATTORNEY.

Patented Sept. 10, 1935

2,013,805

UNITED STATES PATENT OFFICE 2,013,805

MECHANICAL FREE-FLOATING BRAKE DRUM

James Albert McIntosh, Detroit, Mich., assignor to Budd Wheel Company, Philadelphia, Pa., a corporation of Pennsylvania Application May 2, 1932, Serial No. 608,584

10 Claims. (Cl. 188—218)

This invention relates to brake drums and more particularly to drums having internal braking surfaces.

It is my desire to provide a brake drum which is relatively inexpensive to make, and which is susceptible of rapid and positive assembly. I also aim to make a drum which has a rigid braking surface of great heat radiating capacity, free of distortion and capable of annular expansion independently of the backing plate.

I attain the above desirable features by eliminating costly steps in molding, reducing the number of component parts and connecting the two elemental members, namely the braking ring and backing plate by a plurality of annularly spaced joints giving a full free floating connection between these parts.

In this way I eliminate the objectionable bell mouthing because the braking ring may expand freely either annularly or radially independently of the head or backing plate. I may make the two members of the same or different materials but I find that a cast braking ring and a sheet metal head are very satisfactory.

My invention will be better understood when considered in connection with the accompanying drawing, wherein like ordinals represent corresponding parts in the various figures.

Figure 2:
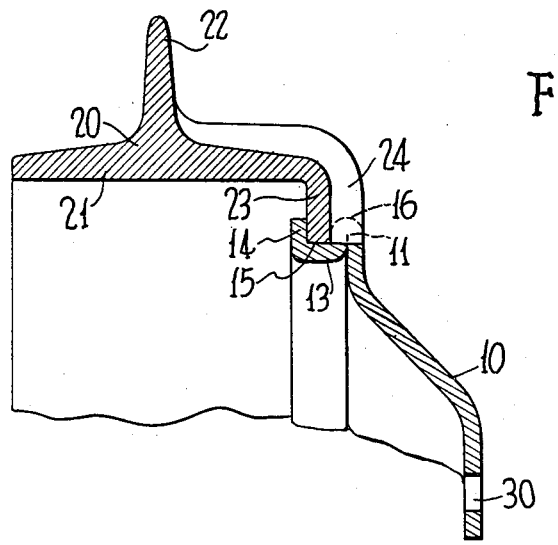
Fig. 2 is a cross section on the line 2—2 of Fig. 1.
Figure 1:
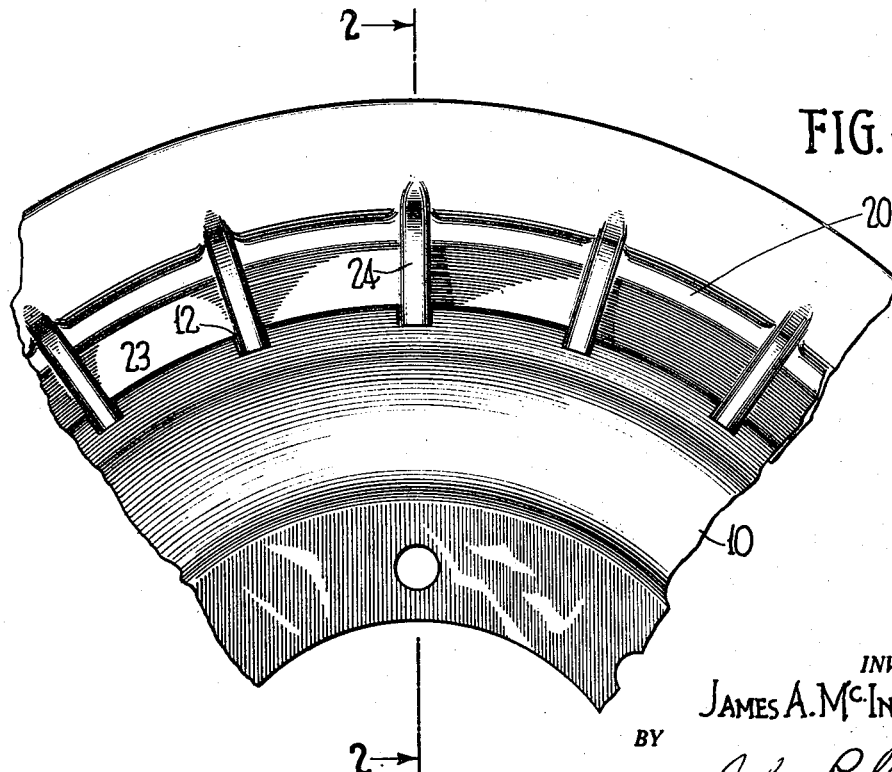
Fig. 1 is a sectored elevation of the drum assembly.

In the drawing a backing plate 10 of pressed metal and a cast metal braking ring 20 form the basic elements of this composite brake drum. The braking ring has an internal braking surface 21 and an external annular rib 22 extending radially outwardly. At one axial extremity of the ring is an annular, radially inwardly extending flange 23. This flange carries a plurality of annularly spaced ribs or lugs 24 radially disposed at right angles to the axis of the ring. The flange 23 and the spaced ribs 24 together with a corresponding slot 12 and pocket 15 on the backing plate form the free floating or mechanical lost motion connection between the two elemental parts. This connection allows radial movement and annular expansion independently of the drum head, but prevents relative rotary motion between said head and ring.

The pressed metal backing plate is made from a suitable sheet metal blank and has an angularly radially extending main portion 10 reversely curved at 11 adjacent its predetermined periphery 16 and extended axially inwardly at 13. The reversely curved portion 11 is slotted at 12 to correspond to the spaced ribs 24 of the braking ring. The braking ring is assembled to the backing plate and the axially inwardly extending portion 13 of the backing plate is then formed radially outwardly at 14 making an annular substantially channel shaped pocket 15 between the radially outwardly extending annular portions 11 and 14. The flange 23 of the braking ring is seated therein with the radial transverse ribs 24 in the slots 12 of the backing plate. A series of bolt holes 30 located about the axle opening serve to secure the drum to a hub flange or other member.

The described method of construction results in a cheap and easily assembled unit having great strength capable of annular expansion independently of the backing plate. It is obvious that the described construction will not be subjected to either inward or outward axial displacement because it has an annular locked relation similar in cross section to a tongue and groove joint. The braking ring may expand without danger of radial displacement because of the locked relation of the ribs and slots and the circumferentially spaced locations of these slots serve to prevent all the expansion going to any one part of the ring.

The herein described mechanical, full free floating, or lost motion, composite brake drum has been selected for the purpose of setting forth the principles involved, and modifications within the scope of this invention are covered by the appended claims.

What I claim is:

1. A composite brake drum comprising a head and a braking ring having an internal braking surface, said ring being secured to said head through a connection effecting the transmission of torque therebetween but allowing free annular expansion of the ring relatively to the head, said connection including an annular channel and means for preventing relative rotary motion of said head and ring.

2. A composite brake drum comprising a head and a braking ring having an internal braking surface, said ring being secured to said head by a mechanical lost motion connection affording provision for the free annular expansion of the ring relatively to the head said connection including a plurality of T-section ribs and T-section slots complementally forming sliding joints between said head and ring.

3. A composite brake drum comprising a head and a braking ring having an internal braking surface, said ring being secured to said head through a connection to a lateral edge of the ring which effects the transmission of torque between the head and the ring but allows free annular expansion of the ring relatively to the head, said connection including an annular channel and means for preventing relative rotary motion of said head and ring.

4. A composite brake drum comprising, in combination, a braking ring having an internal braking surface and a plurality of annularly spaced ribs extending at right angles to the axis of the ring, and a backing plate provided with slots spaced to correspond with said ribs and adapted to receive said ribs to afford a floating connection between the head and the drum.

5. A composite brake drum comprising, in combination a braking ring having an internal braking surface and a plurality of radially disposed, annularly spaced ribs on the exterior of the ring, and a backing plate provided with slots spaced to correspond with said ribs and adapted to receive said ribs to afford a floating connection between the head and the drum.

6. A composite brake drum comprising, in combination a braking ring having a rudimentary annular radially extending flange on one of its axial extremities, a backing plate provided with a pocket adapted to receive said flange, and means interconnecting said ring and plate to effect the transmission of torque therebetween without interfering with the free annular expansion of the ring.

7. A composite brake drum comprising, in combination, a braking ring having a rudimentary annular radially extending flange on one of its axial extremities, a backing plate provided with a pocket adapted to receive said flange, and a rib and slot connection between said ring and plate adapted to effect the transmission of torque therebetween without interfering with the free annular expansion of the ring.

8. A composite brake drum comprising, in combination, a braking ring having a rudimentary annular radially extending flange on one of its axial extremities, a pressed metal backing plate provided with a reversely curved portion adjacent its periphery, said backing plate being extended axially inwardly for a short distance, and then radially outwardly to form a pocket between said reversely curved portion and said radially outwardly extending portion, said reversely curved portion being slotted, and lugs upon said ring flange co-acting with the slots in the reversely curved portion of the backing plate to effect the transmission of torque without interfering with the free annular expansion of said braking ring.

9. The method of constructing a composite brake drum which comprises forming the head with a radially extending shoulder and an axially extending flange, placing a braking ring provided with a radially extending portion upon said flange in abutting relation to said shoulder, and forming the flange radially outwardly to position the radially extending ring portion in a substantially channel-shaped groove.

10. The method of constructing a composite brake drum which comprises forming the head with a radially extending shoulder and an axially extending flange, forming slots in said shoulder at annularly spaced points, placing a braking ring provided with a radially extending portion and having annularly spaced radially extending ribs upon said portion in abutting relation to said shoulder and having the ribs in seated relation to the slots of said head, and forming the flange of said head radially outwardly to position the radially extending ring portion in a substantially channel-shaped groove.

JAMES ALBERT McINTOSH.